(12) United States Patent
Ivanine

(10) Patent No.: US 9,510,585 B2
(45) Date of Patent: Dec. 6, 2016

(54) FUMIGATION CONTROL

(75) Inventor: Serguei Ivanine, New South Wales (AU)

(73) Assignee: Asiaworld Shipping Services PTY Ltd, New South Whales (AU)

(*) Notice: Subject to any disclaimer, the term of this patent is extended or adjusted under 35 U.S.C. 154(b) by 1171 days.

(21) Appl. No.: 13/203,594

(22) PCT Filed: Feb. 26, 2010

(86) PCT No.: PCT/AU2010/000229
§ 371 (c)(1),
(2), (4) Date: Nov. 7, 2011

(87) PCT Pub. No.: WO2010/096881
PCT Pub. Date: Sep. 2, 2010

(65) Prior Publication Data
US 2012/0051968 A1    Mar. 1, 2012

(30) Foreign Application Priority Data
Feb. 26, 2009 (AU) ................. 2009900855

(51) Int. Cl.
*A61L 2/20* (2006.01)
*A01M 13/00* (2006.01)

(52) U.S. Cl.
CPC ........... *A01M 13/00* (2013.01); *A01M 13/003* (2013.01)

(58) Field of Classification Search
CPC ....................................... A61L 2/20
(Continued)

(56) References Cited

U.S. PATENT DOCUMENTS

| 4,989,364 A | 2/1991 | Chaudoin et al. |
| 6,256,905 B1 * | 7/2001 | White ............................ 34/467 |
| 2003/0133834 A1 * | 7/2003 | Karle .............................. 422/33 |

FOREIGN PATENT DOCUMENTS

| CN | 2112278 U | 8/1992 |
| DE | 196 07 053 C1 | 7/1997 |

(Continued)

OTHER PUBLICATIONS

New Zealand Examination Report issued in New Zealand Patent Application No. 594840 dated Aug. 29, 2012.
(Continued)

*Primary Examiner* — Sean E Conley
(74) *Attorney, Agent, or Firm* — McDermott Will & Emery LLP

(57) ABSTRACT

A method for fumigating an enclosed space (12) comprises the steps of containing a gaseous fumigant at a discrete location within the enclosed space (12) so as to displace a volume of gas from the enclosed space, and releasing the contained fumigant from the discrete location and into the enclosed space. The method can employ an apparatus (10) that comprises a flexible enclosure (12) that is inflatable and deflatable with a gas between an expanded configuration and a collapsed configuration. The enclosure (12) can be positioned within the enclosed space (12) prior to fumigant introduction. The apparatus (10) can also comprise an inlet (16) arranged at the enclosure to receive gaseous fumigant therethrough for inflation of the enclosure (12), as well as an outlet (20) and a valve (24) arranged at the enclosure (12). The valve (24) can open and close the outlet (20) to gas flow therethrough such that, when open, gaseous fumigant can be released from the enclosure (12) via the outlet (20) and into the enclosed space (2).

11 Claims, 6 Drawing Sheets

(58) Field of Classification Search
USPC .................................................. 422/28, 292
See application file for complete search history.

(56) References Cited

FOREIGN PATENT DOCUMENTS

| | | |
|---|---|---|
| DE | 197 17 663 A1 | 10/1998 |
| NZ | 571661 A | 7/2010 |
| WO | 00/62607 A1 | 10/2000 |
| WO | WO 00/62607 | 10/2000 |
| WO | 02/03797 A1 | 1/2002 |
| WO | WO 02/03797 A1 | 1/2002 |

OTHER PUBLICATIONS

Office Action issued in Chinese Patent Application No. 201080016034.X dated Nov. 19, 2012.

* cited by examiner

FUMIGATION CONTROL

RELATED APPLICATIONS

This application is the U.S. National Phase under 35 U.S.C. §371 of International Application No. PCT/AU2010/000229, filed on Feb. 26, 2010, which in turn claims the benefit of Australian Application No. 2009900855, filed on Feb. 26, 2009, the disclosures of which Applications are incorporated by reference herein.

TECHNICAL FIELD

An apparatus and method are disclosed for controlling fumigation in an enclosed space. The apparatus and method find particular though not exclusive application in the fumigation of transportation containers, such as shipping containers, and will be primarily described in this context. However, it should be appreciated that the apparatus and method are not in any way limited to such applications and can equally be used with fixed installations that require fumigation (e.g. silos, storehouses, warehouses, etc).

BACKGROUND ART

One mode of fumigating goods (e.g. cargo/produce) in a transportation container (e.g. an ISO shipping container or another type of intermodal freight shipping container) involves inserting a fumigating gas introduction pipe into the container (e.g. through door seals of the container) and supplying a required amount of gaseous fumigant into the airspace of the container. In some larger containers the volume of the gaseous fumigant required can be as much as six (6) cubic metres. During fumigant introduction into the container, the pressure inside the container increases and the fumigant/air mixture thus becomes pressurised to escape into the atmosphere through imperfections of the container (e.g. this escape may occur through the perimeter of the door seals, through the floor, etc). The fumigant/air mix will continue to escape from the container until the pressure inside the container returns to atmospheric. This inadvertent release of fumigant is undesirable both for environmental and economic reasons. Some fumigants, such as methyl bromide, deplete the ozone layer and are highly toxic to humans.

A reference to such background art is not an admission that the art forms a part of the common general knowledge of a person of ordinary skill in the art in Australia or elsewhere.

SUMMARY OF THE DISCLOSURE

In a first aspect there is disclosed an apparatus for enabling the control of fumigation in an enclosed space. The apparatus comprises:
- a flexible enclosure that is inflatable and deflatable with a gaseous fumigant between an expanded configuration and a collapsed configuration, the enclosure being positionable within the enclosed space;
- an inlet arranged at the enclosure to receive a flow of the gaseous fumigant therethrough for inflation of the enclosure;
- an outlet and valve arranged at the enclosure, the valve being adapted to open and close the outlet to gas flow therethrough such that, when open, the gaseous fumigant can be released from the enclosure via the outlet and into the enclosed space.

Such an apparatus can be used to control fumigation, especially in an enclosed space that can be prone to leakage. For example, the enclosed space can be defined in a transportation (e.g. shipping) container. However, the apparatus can also be used to control fumigation in fixed installations such as silos, chambers, storehouses, warehouses, etc. The apparatus can reduce the amount of forced leakage that can occur in such spaces during fumigation.

In this regard, the flexible enclosure can be located in the container (or the like) and inflation via the inlet can be commenced with e.g. a gaseous fumigant. As the enclosure inflates to an expanded configuration the gas (usually air) pressure in the enclosed space increases, whereby this gas progressively leaks from the container. After the enclosure is inflated, the continued leakage of this gas (usually air) allows gas pressure in the enclosed space to approach (or equilibrate) with atmospheric air pressure. The valve at the outlet of the flexible enclosure can then be opened to release fumigant from the enclosure and into the enclosed space, so that the enclosure deflates. As this occurs, the fumigant is also able to occupy the portion of the enclosed space formerly occupied by the inflated flexible enclosure (i.e. as the enclosure progressively deflates). In this way, fumigation of the enclosed space can take place with minimal pressure build up, whereby leakage of a fumigant/air mixture from the container is substantially reduced or prevented.

In one embodiment the apparatus can further comprise a fan positionable at the outlet whereby, when the fan is activated and when the valve is open, the fan can cause the gaseous fumigant within the enclosure to flow through the outlet (e.g. under pressure). The fan can thus speed up the fumigant release step.

In one embodiment the inlet can be located in proximity of the outlet. This can simplify manufacture and service of the enclosure. Alternatively, the inlet can be located at an opposite end of the enclosure to the outlet, whereby in use the outlet can be positioned innermost of the enclosed space and the inlet can be positioned closer to a gas line introduction point to the enclosed space.

Whilst the inlet can be defined separately to the outlet, in an alternative embodiment the inlet and outlet can be contiguous, whereby selection of the inlet or outlet can simply be effected by a control valve (e.g. that is remotely controlled). This control valve can comprise the same or a different valve to the outlet valve.

The apparatus can further comprise a gas supply line that is arranged to extend to connect to the inlet. In one embodiment, the gas supply line can extend from outside the enclosed space (e.g. from a gaseous fumigant source) and into the enclosed space. In an alternative embodiment, the gas supply line can extend from a fumigation module locatable at an entrance to the enclosed space (e.g. locatable at the door opening of a transportation container). Such a module can then be separately connected to a gaseous fumigant source (i.e. the source can be located on or remotely from the module).

When the valve is closed, gaseous fumigant can be pumped into the gas line from the gaseous fumigant source and via the inlet into the enclosure. Alternatively or additionally the fan can be configurable whereby, when activated, it can cause gaseous fumigant to flow into the enclosure via the inlet. The gas source can comprise, for example, an apparatus for generating gaseous fumigant located outside the enclosed space.

In one embodiment the valve can be adapted to be remotely operated from outside the enclosed space. This allows the use and control of the apparatus to be effected from outside the enclosed space, with the attendant safety benefits.

In a simple form the valve can comprise a flap that can pivot from the closed position to the open position. The flap can be pivotally mounted to a support located at the outlet, with a remotely operated actuator (e.g. a catch) being arranged with respect to the support to release the flap and allow it to pivot from the closed position to the open position.

In one embodiment the flexibility of the enclosure can be such as to enable inflation and deflation thereof. In this regard, the enclosure can be formed from a gas impermeable material. For example, the enclosure can be formed from a tight-woven polymeric fibrous material, or from a polymer coated woven synthetic fibre etc.

The apparatus of the first aspect is preferentially adapted for use with a gaseous fumigant, and is optimally though not exclusively adapted for use in a transportation container for the fumigation of produce/cargo therewithin (e.g. the flexible enclosure can be adapted to be located on top of the produce/cargo to operate in the headspace of the transportation container).

When the transportation container is a shipping container, the gas supply line can be arranged in use to pass via a seal of a closed door of the shipping container and can then extend and connect to the inlet of the flexible enclosure.

In a second aspect there is disclosed a method for fumigating an enclosed space. The method comprises the steps of:
(i) containing a gaseous fumigant at a discrete location within the enclosed space so as to displace a volume of gas from the enclosed space; and
(ii) releasing the contained fumigant from the discrete location and into the enclosed space.

As with the first aspect, the method of the second aspect can reduce the amount of forced leakage that can occur from the enclosed space during a fumigation procedure, whether that space is located in a portable container or in a fixed installation.

In step (i) of the method, the fumigant can be contained in the discrete location by a gas-impermeable membrane. For example, the membrane can define a flexible enclosure that is locatable in the enclosed space (i.e. prior to step (i)) in a deflated, collapsed configuration, and that during step (i) is inflated to an expanded configuration by introducing the gaseous fumigant thereinto. Alternatively, a pre-inflated enclosure can be located in the enclosed space.

In step (ii) of the method, the fumigant can be released from the discrete location and into the enclosed space once the pressure in the enclosed space approaches or has equilibrated with atmospheric pressure. In contrast to prior methods, this means that fumigant is initially released into the enclosed space without there being any substantial build-up of pressure in the space.

In this regard, the fumigant can be released from the discrete location into the enclosed space so as to also re-occupy a substantial portion of the volume previously occupied by the fumigant in the discrete location. For example, when the fumigant is contained in a flexible enclosure, the method can be operated whereby the fumigant is able to re-occupy the previously occupied volume due to the enclosure deflating to the collapsed configuration (i.e. as fumigant is released therefrom).

In one embodiment, when fumigating an enclosed space such as a container containing produce/cargo, and prior to step (i), the flexible enclosure can be located in a portion of the enclosed space not occupied by the produce/cargo. For example, the flexible enclosure can be located on top of the produce/cargo to be fumigated such that, when inflated, the enclosure occupies a portion of the container headspace, and displaces air from that portion.

The method of the second aspect can employ the apparatus of the first aspect.

BRIEF DESCRIPTION OF THE DRAWINGS

Notwithstanding any other forms which may fall within the scope of the fumigation apparatus and method as set forth in the Summary, specific embodiments of the apparatus and method will now be described, by way of example only, with reference to the accompanying drawings in which.

DETAILED DESCRIPTION OF SPECIFIC EMBODIMENTS

Figure 1:
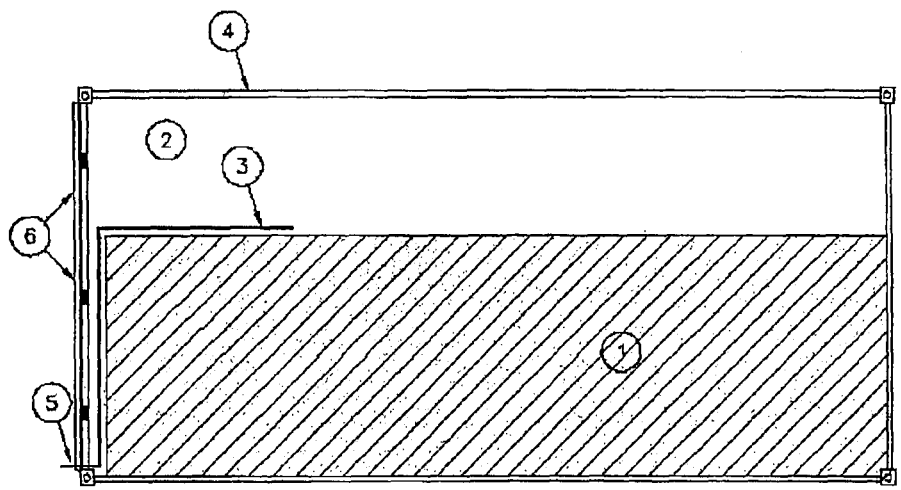
FIG. 1 depicts in schematic cross-sectional elevation a container being fumigated using a known fumigation technique.

Referring firstly to FIG. 1, a known method for fumigation of goods (1) (e.g. cargo/produce) in a shipping container (4) is depicted in a simplified and schematic form. In this method, a gas introduction pipe (3) is inserted through the shipping container door seals (5) and the required amount of gaseous fumigant is supplied into the airspace (2) of the shipping container.

With progressive fumigant introduction into the shipping container, the pressure inside the shipping container increases, whereby the fumigant/air mixture escapes into atmosphere through imperfections of the shipping container. These imperfections can arise during manufacture, but more typically develop with use of the container over time, and can be formed at the perimeter of the container's door seals (6), through the floor, at joins etc. The fumigant/air mix continues to escape from the shipping container until the pressure inside the shipping container reaches atmospheric.

Figure 2:
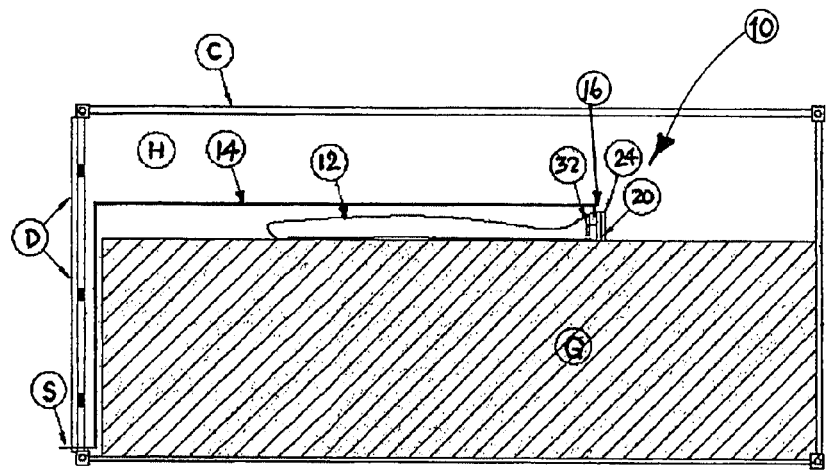
FIG. 2 depicts in schematic cross-sectional elevation a container in a first stage of fumigation using a first fumigation apparatus and method embodiment as herein described.

Referring now to FIG. 2 a first fumigation control apparatus is shown in the form of a pressure equalising device 10 for enabling the control of and for improving the safety and reducing the cost of fumigation in an enclosed space, in the form of an interior of a container C. Container C is, in this example, an ISO shipping container but it may be any suitable type of container. In another example, an intermodal freight shipping container may replace container C. Container C may also comprise a fixed installation (e.g. silo, warehouse, shed, etc).

A primary use of the device 10 is for better control and management of fumigation of goods G in transportation (e.g. shipping) containers that are prone to leakage. However, the device can also be used to control fumigation of goods in fixed installations such as silos, chambers, storehouses, warehouses, and the like. The device can be employed and operated as part of a fumigation procedure whereby the amount of forced leakage of fumigant can be substantially reduced from transportable containers and fixed installations, thereby improving the safety and reducing the cost of fumigation.

The device 10 comprises a flexible enclosure in the form of a gas envelope 12 that is inflatable and deflatable with a gas (usually a gaseous fumigant) between an expanded configuration (FIGS. 3 and 6) and a collapsed configuration (FIGS. 2, 4, 5 and 7).

Figure 5:
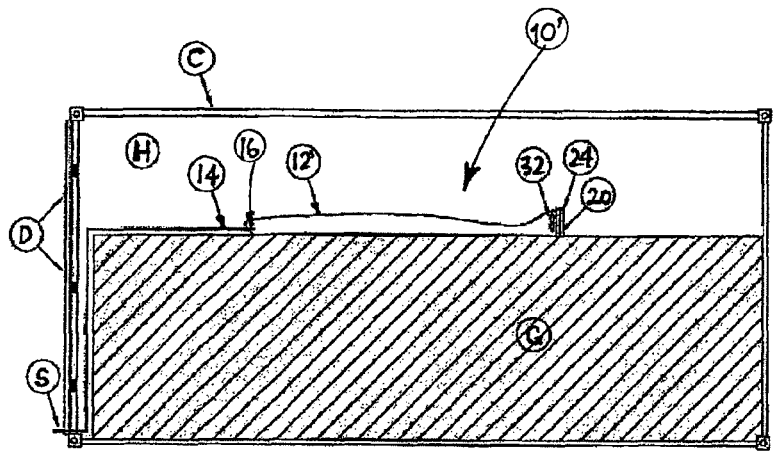
FIG. 5 depicts in schematic cross-sectional elevation a container in a first stage of fumigation using a second fumigation apparatus and method embodiment as herein described.
Figure 6:
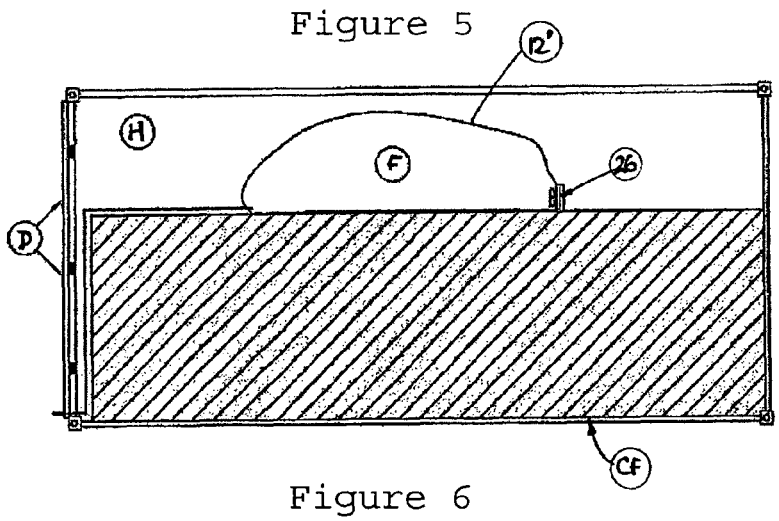
FIG. 6 depicts the container of FIG. 5 in a second stage of fumigation.
Figure 7:
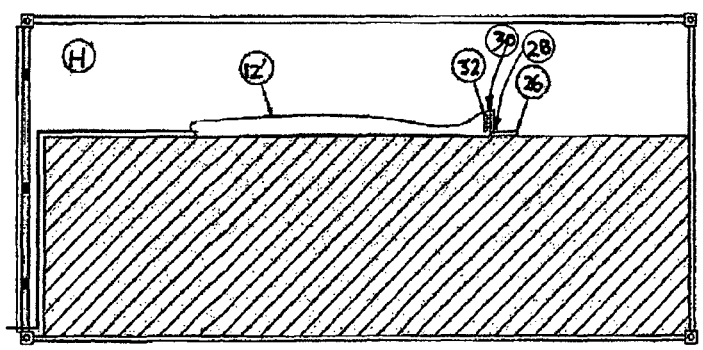
FIG. 7 depicts the container of FIG. 5 in a third stage of fumigation.

In the embodiment of FIGS. 5 to 7, the device 10 is denoted as device 10' and the envelope 12 is denoted as envelope 12'. The difference in configurations is described below, but otherwise the operation of each device is identical.

In its collapsed configuration the envelope 12 can have the form of a rectangular mat comprising opposing rectangular panels which are edge-sealed around their perimeter to define a hollow interior. Each panel is formed from a gas impermeable material, for example, a tight-woven polymeric fibrous material, or a polymer coated woven synthetic fiber etc.

Such a mat can be rolled for storage, for transportation and for initial positioning in the container (e.g. to be easily located by a single operator on top of and at a proximal end of the cargo/produce to be fumigated). When ready to be used, the mat is then un-rolled out along the top of the cargo/produce to be fumigated, so as to easily locate itself ready for use, and to expand (when inflated) into the headspace H of the container C. The envelope 12 is connected to a gas supply line 14 which supplies a gaseous fumigant (e.g. sublimated methyl bromide) from a remote gaseous source into the interior of the envelope 12 to inflate the envelope (as described hereafter). The remote gaseous source can comprise a known fumigant sublimation and pumping apparatus located outside the container C.

The device 10 comprises an inlet 16 arranged at the enclosure to connect to the gas supply line 14 so as to receive the gaseous fumigant and pass it through to the envelope interior to inflate the envelope. The gas supply line 14 is arranged in use to pass from the fumigant generation apparatus via a seal S of closed door D of the container C, and to then extend and connect to the inlet 16.

The device 10 further comprises an outlet 20 which is closed by a valve in the form of a flap valve 24. The flap valve 24 further comprises a flap 26 that is pivotally mounted via a pivot/hinge point 28 to a frame 30 of the outlet 20. To open the outlet 20, the flap 26 is released (i.e. remotely) to pivot down to the location as shown in FIGS. 4 and 7. To close the outlet 20, the flap 26 is typically pivoted up (FIGS. 2, 3, 5 and 6). Usually this is affected manually by the operator before and after a fumigation procedure, though it can be automated by a motor/gear driven actuator.

Figure 3:
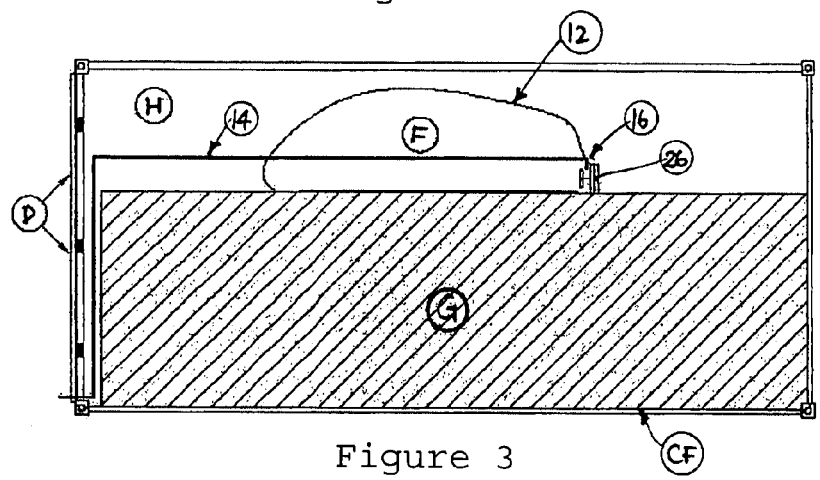
FIG. 3 depicts the container of FIG. 2 in a second stage of fumigation.
Figure 4:
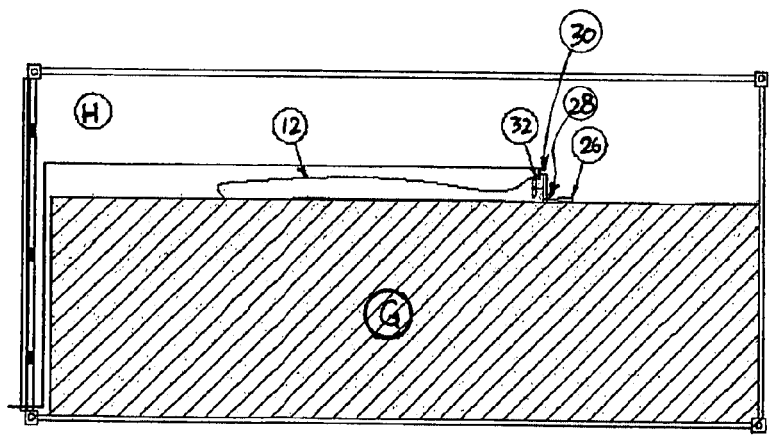
FIG. 4 depicts the container of FIG. 2 in a third stage of fumigation.

In the embodiment of the device 10 of FIGS. 2 to 4 the inlet 16 is located in proximity of the outlet 20. This can simplify manufacture and service of the device. In the embodiment of the device 10' of FIGS. 5 to 7 the inlet 16 is located at an opposite end of the envelope 12 to the outlet 20. In use of the device 10', the outlet 20 is positioned innermost of the container C with respect to the door D and the inlet 16 is positioned closer to the door D (i.e. closer to where the gas supply line 14 enters the container). Otherwise, the operation of each device is identical.

During inflation of envelope 12 (FIGS. 2 and 5) the flap valve 24 has been pivoted up and latched to close the outlet 20 to prevent gaseous fumigant flowing out of the envelope interior. The remote operation of the flap valve can be achieved via an electrical or manual control line that feeds in with (or as part of) the gas supply line, or can be achieved by an Electro-magnetic field (EMF) radiation transmitter and receiver (for example, a radio transceiver or microwave transceiver), to provide an operator with the attendant safety benefits. In this regard, a remote controller held by the operator is used to control an actuator that in turn releases a catch holding the flap valve 24 in the closed position, allowing the flap to pivot down from the closed position to the open position. Thus, at a suitable time after inflation of enclosure 12 with a gaseous fumigant F (FIGS. 3 and 6), the catch holding the flap valve 24 is released to open the outlet, thereby releasing gaseous fumigant from the enclosure and into the enclosed space of container C.

To improve and expedite fumigant release from envelope 12, the device 10 further comprises a fan 32 that is located adjacent to the outlet 20. Again, the fan can be remotely activated by the remote controller held by the operator. This activation can be triggered automatically when the outlet is opened, or the fan can be activated independently. In any case, when the outlet 20 is open (flap 26 down) the fan 32 causes gaseous fumigant within the inflated envelope 12 to be forced out through the outlet under pressure, thereby speeding up this part of a fumigation procedure.

In use, the device 10 is located in the container C and is inflated with a gaseous fumigant F. As the envelope 12 inflates to an expanded configuration (FIGS. 3 and 6) the air pressure in the container C increases. Especially in the case of shipping containers (which are not cost effective to fabricate in a highly gas-tight manner, and which generally do not remain gas-tight over time) the air progressively leaks from the container. After the envelope 12 is inflated, the continued leakage of air eventually allows the air pressure in the container C to approach (or equilibrate) with atmospheric air pressure. The flap valve 26 is then opened to release fumigant from the envelope 12 and into the container C, so that the envelope deflates. As this occurs, the fumigant is also able to occupy that portion of the container interior formerly occupied by the inflated envelope. In this way, fumigation of the container can take place with minimal pressure build up, whereby leakage of a fumigant/air mixture from the container is substantially reduced or prevented.

Figure 8:
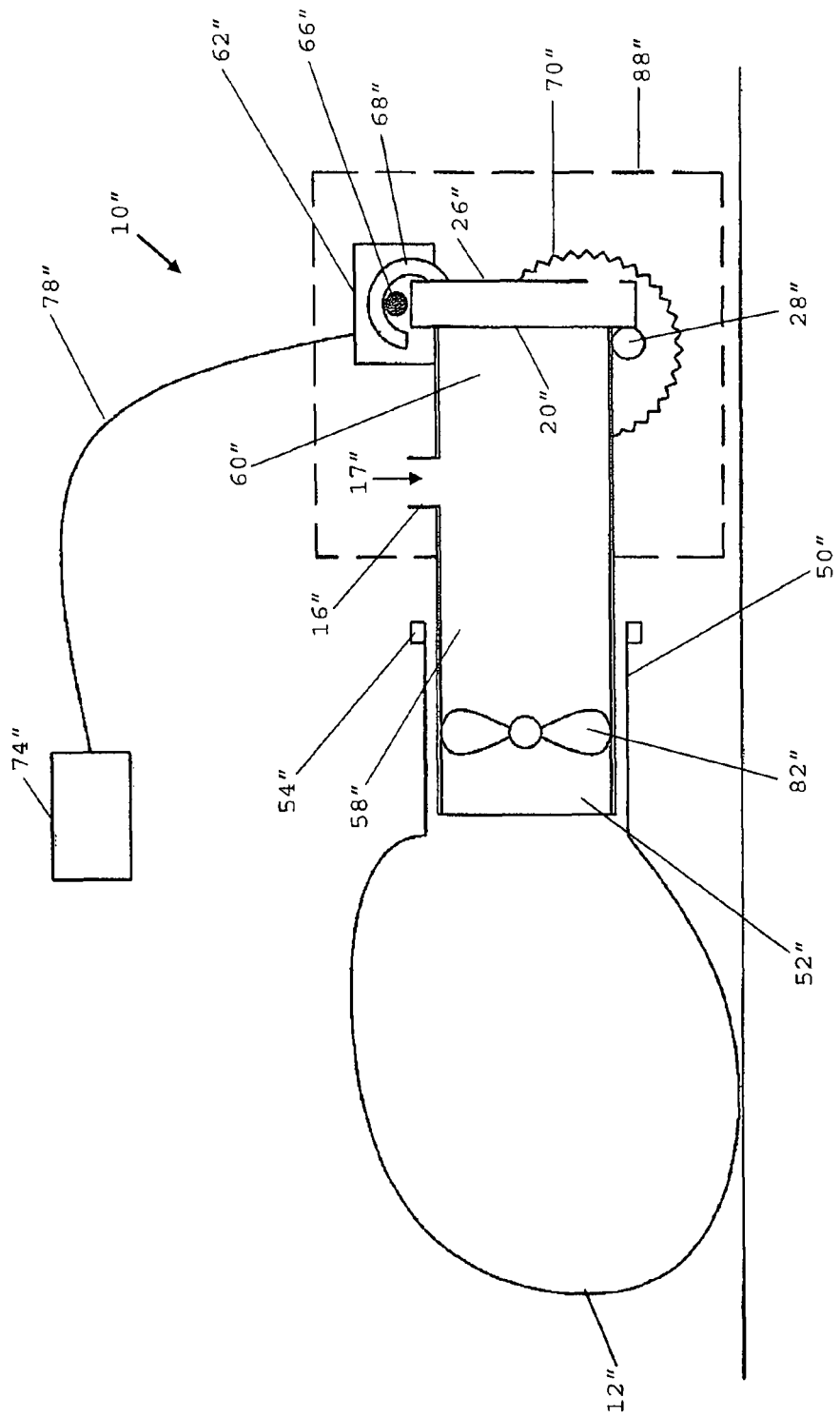
FIG. 8 depicts a cross sectional elevation of a third embodiment of a fumigation apparatus.
Figure 9:
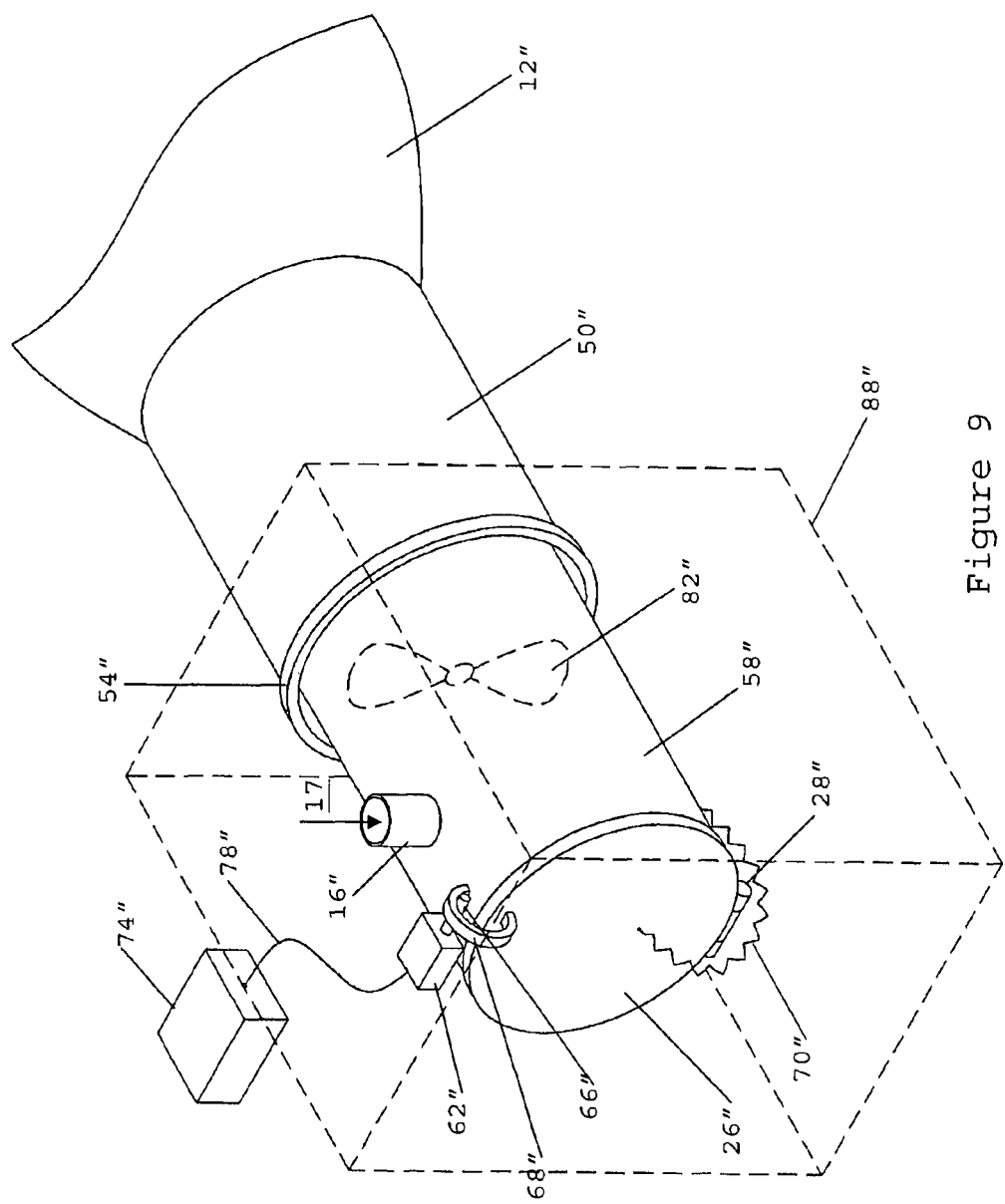
FIG. 9 shows a perspective view of one end of the fumigation apparatus of FIG. 8 in a closed configuration.
Figure 10:
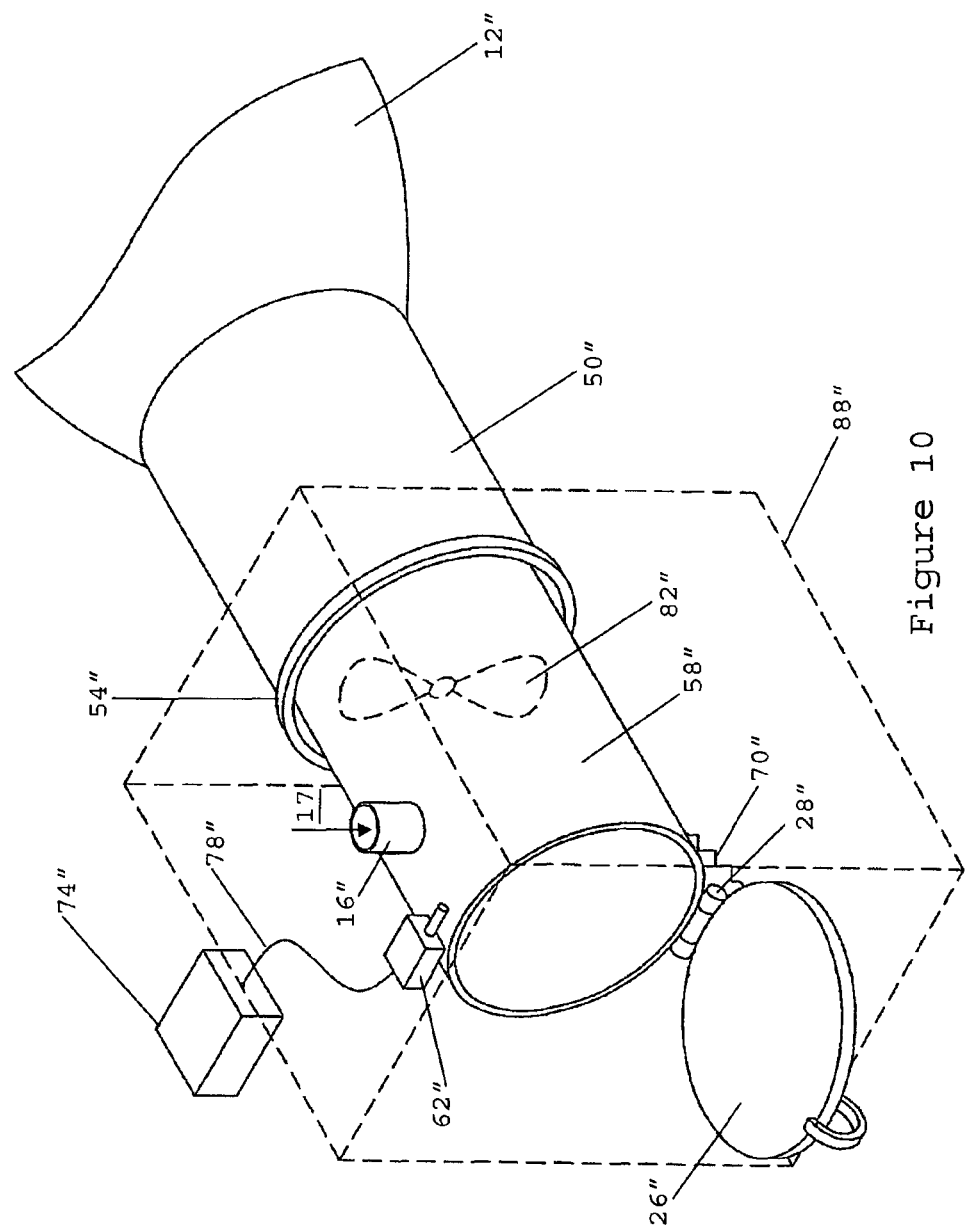
FIG. 10 shows the fumigation apparatus of FIGS. 8 and 9 but in an open configuration.

FIGS. 8 to 10 show another embodiment of a fumigation apparatus generally indicated by the numeral 10", wherein parts of the apparatus similar to those parts of the previously presented embodiments are similarly numbered. The apparatus 10" is located in a head space H. The apparatus 10" comprises an envelope 12" having a throat 50" which is, at least in this embodiment, integrally formed with the envelope 12". One end 52" of a pipe 58" is inserted into the throat 50". A clamp 54" extends around the throat and is tightened to form a gas tight seal between the throat 50" and the pipe 58". Another end 60" of the pipe is closed by a valve comprising an openable flap 26". The pipe 58" has a gas inlet 16" in the form of a protruding pipe which is used to introduce a gas 17" into the envelope 12" via the pipe 58". A solenoid 62" is adapted to withdraw a bolt 66" from a bolt retainer 68". The flap then, under the influence of a biasing member in the form of a spring 70", rotates around pivot 28" thus opening the end 60". The gas in the envelope can then travel down the pipe and into the headspace H. A fan 82" assists the fumigant to move down the pipe. The solenoid 62" can be controlled by an individual (or even a control system) operating a remote control unit 74" connected to the solenoid 62" by an electrical cable 78". The openable end of the pipe is protected by a cage 88" to prevent inadvertent opening of the valve when bumped, for example, and the subsequent release of the toxic fumigant stored within the envelope 12". The cage 88" also protects its contents from inadvertent damage, for example in the event that cargo falls on to it.

EXAMPLE

Fumigation Procedure

A first procedure for fumigating an enclosed space of a container C comprised, in overview, the major steps of:
(1) Containing a gaseous fumigant at a discrete location of unoccupied space H of container C so as to displace a volume of air therefrom.
(2) Releasing the contained fumigant from the discrete location and into the air of the enclosed space of container C.

This procedure was able to be performed whereby the amount of forced leakage that occurred from the container C during a fumigation procedure was substantially reduced. This procedure was also able to be performed by a single operator.

Prior to step (1) a gas-impermeable rectangular envelope 12 was located by the operator on top of the goods G in container C in a deflated, rolled-up configuration. The envelope was un-rolled over the top of the goods G and was connected to the gas supply line 14 and to the electrical/manual control line (when employed). The container door D was closed, with the line(s) passing through a given door seal S.

To contain the gaseous fumigant (step (1)) the envelope 12 was inflated to an expanded configuration by pumping the gaseous fumigant thereinto via line 14 from a known fumigant generation apparatus located outside the container C. The inflating envelope expanded into the container headspace H and displaced air inside the container, causing it to leak through the perimeter of the door seals S, through the container floor CF, through cracks in wall-to-wall and wall-to-floor joins etc.

Once the envelope 12 was inflated, and after a relatively brief period, the air pressure in the container approached or equilibrated with atmospheric pressure outside the container.

At this time, the operator commenced step (2) of the procedure. In this regard, the operator, via a hand-held controller, remotely opened the flap valve 26 and activated the fan 32. This caused the fumigant in the envelope to be pumped therefrom and into the enclosed space of the container C. It was observed that the fumigant was initially released into the enclosed space without there being any substantial build-up of gas pressure therein. By controlling/optimising the rate of fumigant release from envelope 12, very little (if any) build up of pressure occurred in the container C during fumigant release.

In this regard, the fumigant was able to be released at a rate that matched the increasing volume of the container space resulting from deflation of the envelope 12, whereby the gaseous fumigant also re-occupied the volume previously occupied by the inflated envelope.

Once the fumigant was substantially released from the envelope 12, the fan was shut off, and the container was left sealed for a fumigation interval. In this respect, the fumigant was able to penetrate the goods in the container and exterminate vermin in a known manner.

After fumigation, the spent fumigant was extracted from the container and captured in a known manner. The container door was opened, and the device 10 was rolled up and removed from the container.

Whilst a number of specific fumigation apparatus and method embodiments have been described, it should be appreciated that the fumigation apparatus and method may be embodied in other forms.

For example, the fumigant inlet and outlet can be made contiguous. In this configuration, selection of the inlet or outlet can again be effected by a remotely controlled valve. This control valve can comprise the same or a different valve to the flap valve 26. For example, the valve may comprise a plate located within the contiguous (e.g. bifurcated) inlet-outlet which pivots between inlet-open/outlet-closed and inlet-closed/outlet-open positions. In some circumstances, the envelope may be inflated with the fumigant or other gas prior to being inserted into the container, and the gas released once it has been so inserted and the container closed.

The fan 32 can also be configured whereby, when the flap valve 26 is closed, the fan can be activated to cause gaseous fumigant to flow into the envelope 12 via the inlet (i.e. instead of being pressure fed from a remote source, the fumigant is drawn in by the fan—e.g. using a venturi effect). When the flap valve 26 is closed, the same fan can then be used to expel gaseous fumigant from the envelope 12.

In addition, whilst the gas supply line 14 is shown extending from a gas source located outside the container C, the gas supply line can extend from a fumigation module that can be sealingly located at the door opening of the container. The module can be separately connected to the gas source, and the gas source can be located on or remotely from the module. For example, the module can be as outlined in the applicant's patent publication WO 02/03797.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the grate and its construction and installation methods.

The invention claimed is:

1. An apparatus for enabling the control of fumigation in a shipping container, the apparatus comprising:
   a flexible enclosure that is inflatable and deflatable with a gaseous fumigant between an expanded configuration and a collapsed configuration, the enclosure being positionable within the shipping container and, in the collapsed configuration, taking the form of a mat;
   an inlet arranged at the enclosure to receive a flow of the gaseous fumigant therethrough for inflation of the enclosure;
   an outlet, a remotely operated actuator, and a valve arranged on the enclosure, the actuator being adapted to be remotely operated from outside the shipping container to move the valve into an open position or a closed position to open and close the outlet to gas flow therethrough such that, when open, the gaseous fumigant can be released from the enclosure via the outlet and into the shipping container, and when closed, the gaseous fumigant is prevented from being released from the enclosure via the outlet to allow an air pressure in the shipping container to approach atmospheric air pressure.

2. An apparatus as claimed in claim 1 further comprising a fan positionable at the outlet whereby, when the fan is activated and the valve is open, the fan causes gaseous fumigant within the enclosure to flow through the outlet.

3. An apparatus as claimed in claim 1 wherein the inlet is located in proximity of the outlet.

4. An apparatus as claimed in claim 3 further comprising a gas supply line arranged to extend from outside the shipping container to connect to the inlet whereby, when the valve is closed, the gaseous fumigant can be pumped into the gas line and/or the fan can be activated to cause the gaseous fumigant to flow into the enclosure via the inlet.

5. An apparatus as claimed in claim 4 wherein the gas supply line is connected to a gaseous fumigant source located outside the shipping container.

6. An apparatus as claimed in claim 1 wherein the valve comprises a flap that can pivot from the closed position to the open position.

7. An apparatus as claimed in claim 6 wherein the flap is pivotally mounted to a support located at the outlet, with the remotely operated actuator being arranged with respect to the support to release the flap to enable the flap to pivot from the closed position to the open position.

8. An apparatus as claimed in claim 1 wherein the flexible enclosure is formed from a gas impermeable material.

9. An apparatus as claimed in claim 8 wherein the enclosure is formed from a tight-woven polymeric fibrous material.

10. An apparatus as claimed in claim 1 that is adapted for use in the shipping container for the fumigation of produce/cargo therewithin.

11. An apparatus as claimed in claim 10 wherein in use a gas line is arranged to pass via a seal of a closed door of the shipping container, the gas line extending and connecting to the inlet.

* * * * *